US008109399B1

(12) United States Patent
Sheffield et al.

(10) Patent No.: US 8,109,399 B1
(45) Date of Patent: Feb. 7, 2012

(54) DRINK BOTTLE FUNNEL

(76) Inventors: William R. Sheffield, Indio, CA (US); Laura K. McBrayer-Sheffield, Indio, CA (US)

( * ) Notice: Subject to any disclaimer, the term of this patent is extended or adjusted under 35 U.S.C. 154(b) by 0 days.

(21) Appl. No.: 12/719,044

(22) Filed: Mar. 8, 2010

(51) Int. Cl.
*B65D 1/02* (2006.01)
*B65D 23/12* (2006.01)
*A47J 42/50* (2006.01)

(52) U.S. Cl. ........ 215/386; 215/390; 220/212; 220/735; 141/340; 141/343

(58) Field of Classification Search .................... 215/40, 215/386, 228, 390, DIG. 7; 141/340, 342, 141/343; 220/212, 735
See application file for complete search history.

(56) References Cited

U.S. PATENT DOCUMENTS 589,659 A * 9/1897 Krack ........................... 141/343
4,149,575 A * 4/1979 Fisher ............................. 141/98
4,823,848 A 4/1989 Sentmore, Sr. et al.
5,080,149 A 1/1992 Peoples
D325,497 S 4/1992 Albertson
5,101,870 A * 4/1992 Farris ............................ 141/343
5,921,296 A 7/1999 Porter et al.
6,116,299 A 9/2000 Cummins et al.
D432,915 S 10/2000 Smith
6,397,907 B1 * 6/2002 Heintz .......................... 141/338
6,425,424 B1 7/2002 Ellis Calvo et al.
6,470,928 B1 10/2002 Davis et al.
D511,455 S 11/2005 Newell
7,690,521 B1 * 4/2010 Herrera ........................ 215/11.1
2003/0197020 A1 * 10/2003 Murakami et al. ............ 220/739
2006/0151420 A1 * 7/2006 Espenschied ................. 215/276
2007/0079898 A1 * 4/2007 Grover et al. ................. 141/340
2009/0107582 A1 * 4/2009 Sayage ......................... 141/340

* cited by examiner

*Primary Examiner* — Sue Weaver

(57) ABSTRACT

A drink bottle funnel for attaching securely to a drink bottle to facilitate pouring flavoring into the drink bottle includes a main portion formed by a circumferential wall having a top opening and a bottom opening. A tubular connection portion extends from the main portion around the bottom opening. An interior surface of the connection portion has interior surface threads. Thus, the connection portion is designed for threadably engaging the threaded neck of a drink bottle.

13 Claims, 5 Drawing Sheets

DRINK BOTTLE FUNNEL

BACKGROUND OF THE DISCLOSURE

1. Field of the Disclosure

The disclosure relates to funnels and more particularly pertains to a new funnel for attaching securely to a drink bottle to facilitate pouring flavoring into the drink bottle.

2. Summary of the Disclosure

An embodiment of the disclosure meets the needs presented above by generally comprising a main portion formed by a circumferential wall having a top opening and a bottom opening. A tubular connection portion extends from the main portion around the bottom opening. An interior surface of the connection portion has interior surface threads. Thus, the connection portion is designed for threadably engaging the threaded neck of a drink bottle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
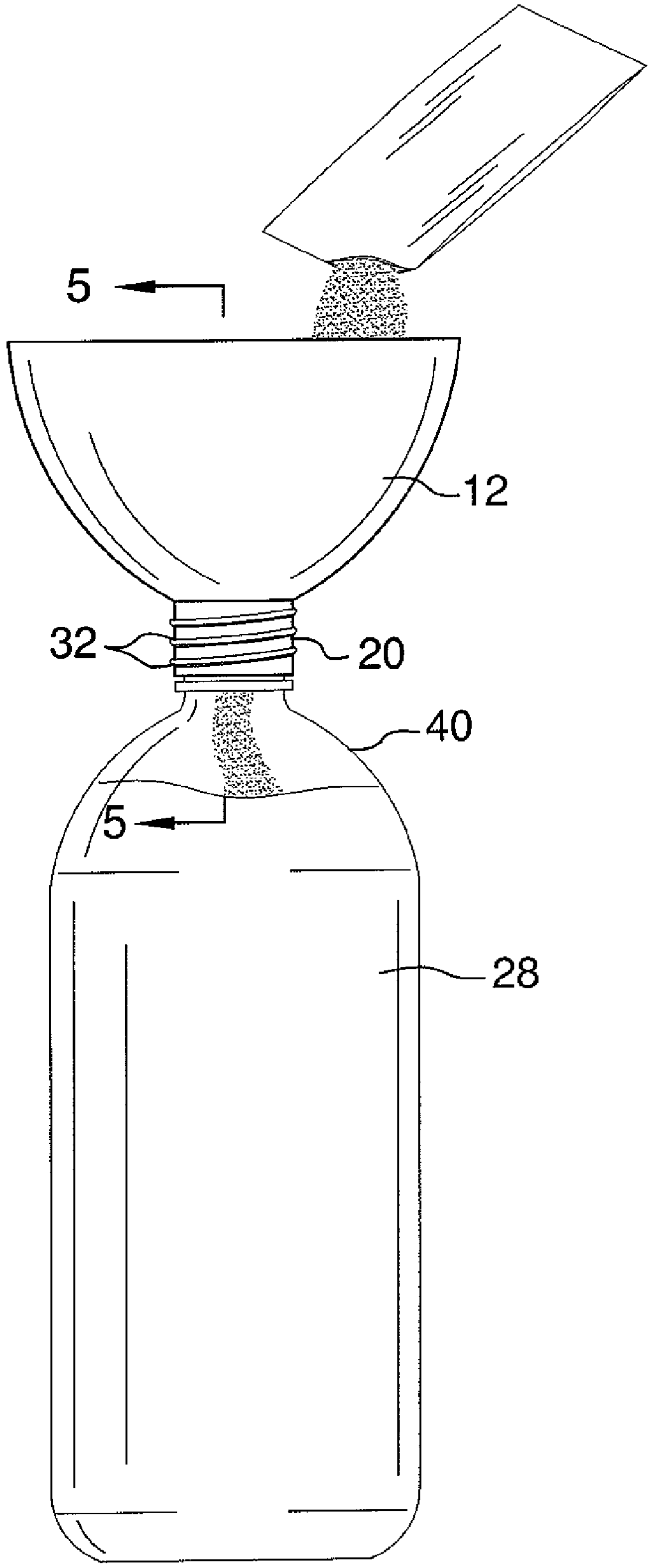
FIG. 1 is a top perspective view of a drink bottle funnel according to an embodiment of the disclosure.
Figure 2:
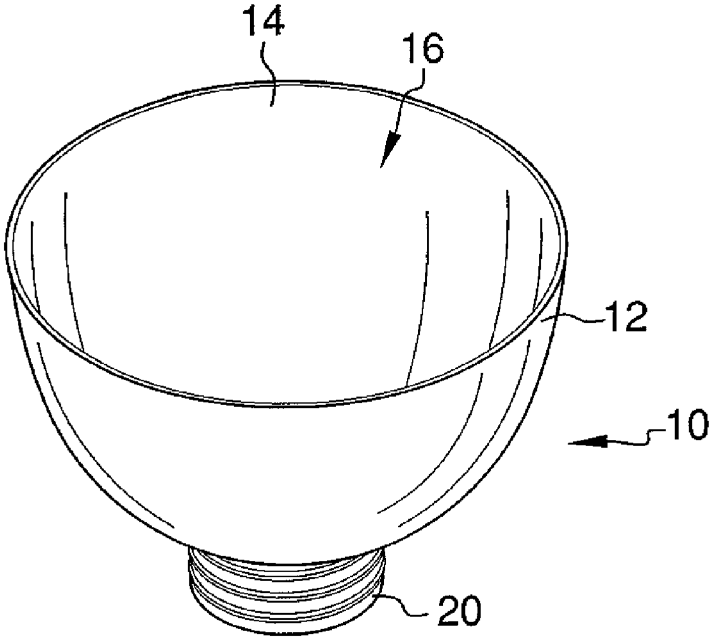
FIG. 2 is a bottom perspective view of an embodiment of the disclosure.
Figure 3:
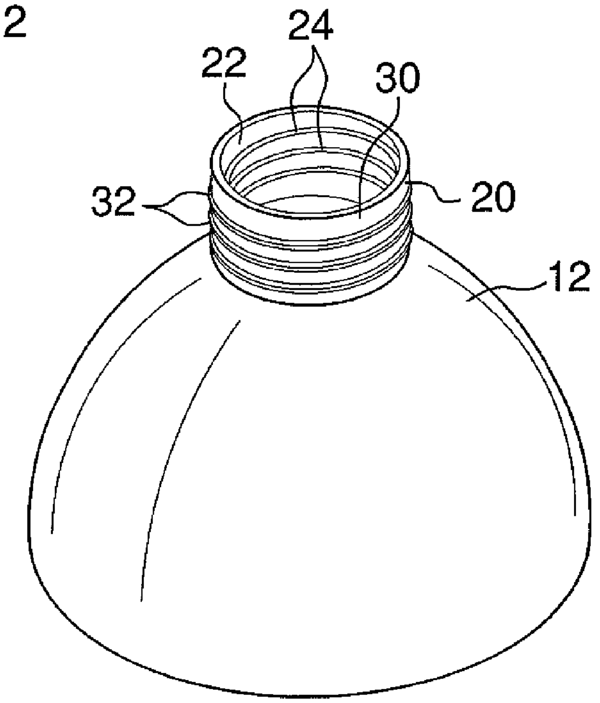
FIG. 3 is a side view of an embodiment of the disclosure in use.
Figure 4:
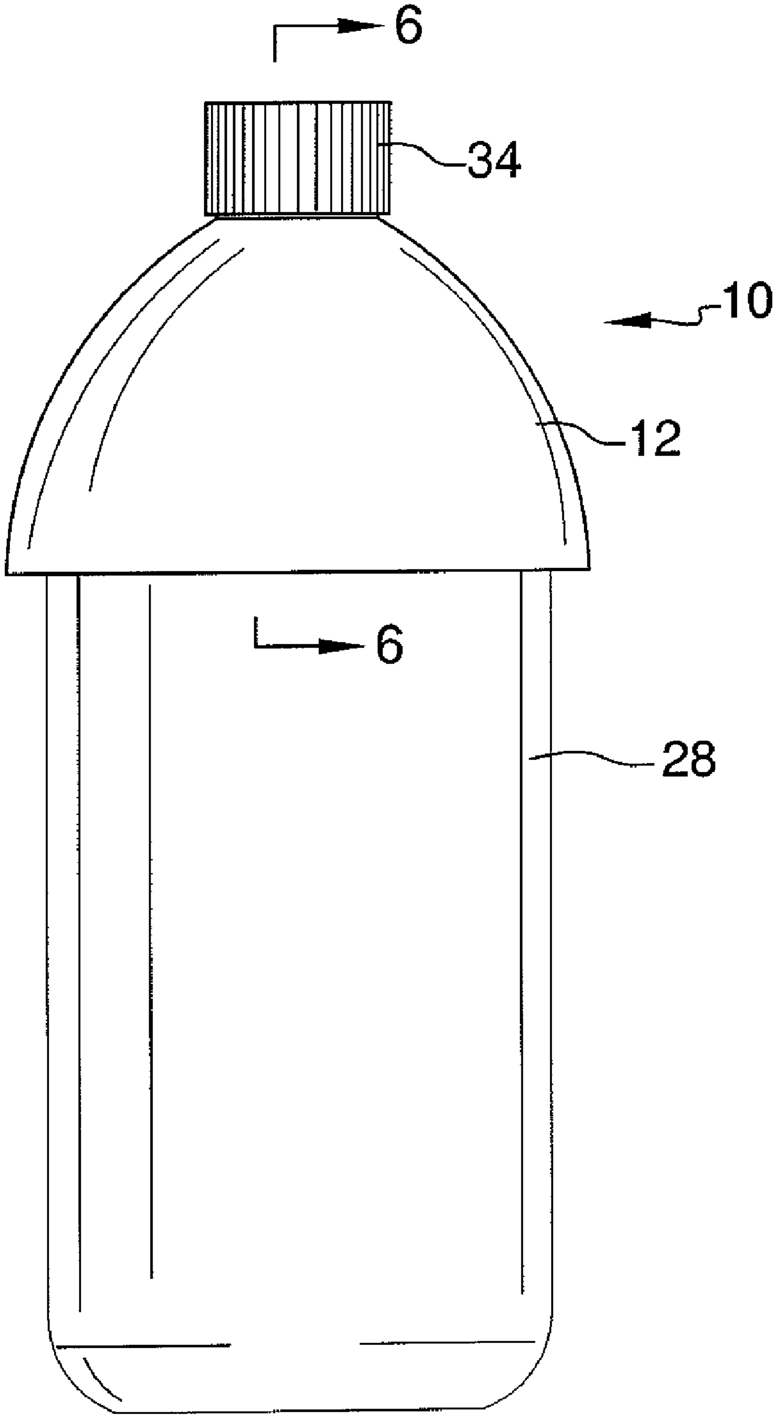
FIG. 4 is a side view of an embodiment of the disclosure in a storage position.
Figure 5:
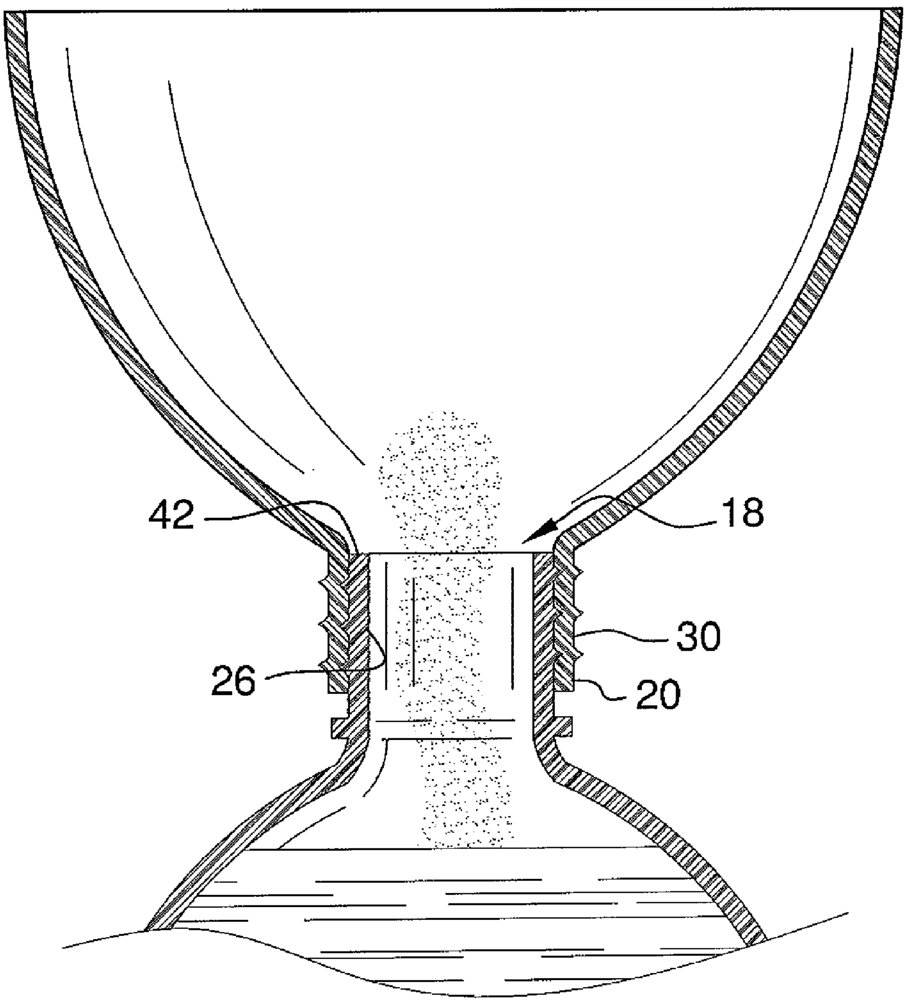
FIG. 5 is a cross-sectional view of an embodiment of the disclosure taken along line 5-5 of FIG. 1.
Figure 6:
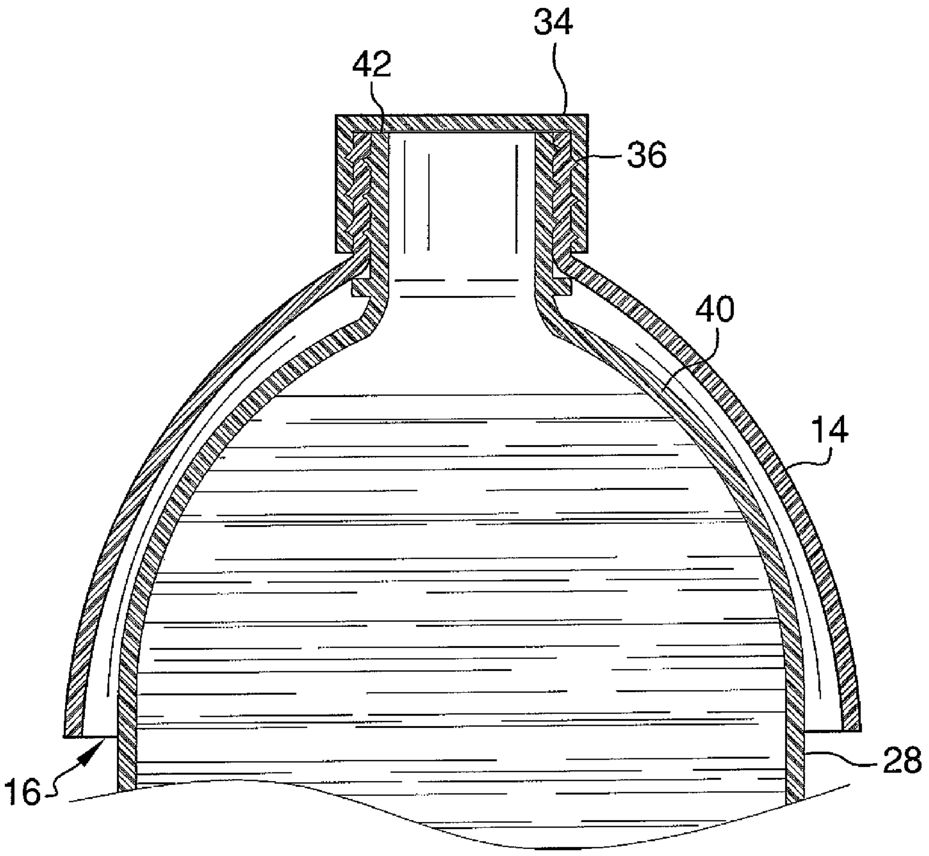
FIG. 6 is a cross-sectional view of an embodiment of the disclosure taken along line 6-6 of FIG. 4.

With reference now to the drawings, and in particular to FIGS. 1 through 6 thereof, a new funnel embodying the principles and concepts of an embodiment of the disclosure and generally designated by the reference numeral 10 will be described.

As best illustrated in FIGS. 1 through 6, the drink bottle funnel 10 generally comprises a main portion 12 formed by a circumferential wall 14 having a top opening 16 and a bottom opening 18. A tubular connection portion 20 extends from the main portion 12 around the bottom opening 18. An interior surface 22 of the connection portion 20 has interior surface threads 24. Thus, the connection portion 20 is designed for threadably engaging a threaded neck 26 of a drink bottle 28. An exterior surface 30 of the connection portion 20 has exterior surface threads 32. A cap member 34 has cap threads 36 for engaging the exterior surface threads 32.

The circumferential wall 14 is curved extending from the bottom opening 18 to the top opening 16. The top opening 16 and the bottom opening 18 are circular. The bottom opening 18 is smaller in diameter than the top opening 16. The top opening 16 has a diameter of 2.5 inches. The connection portion 20 and the main portion 12 have a combined height of 2 inches.

The interior surface threads 24 extend along a full length of the connection portion 20 such that the connection portion 20 is designed for engaging the threaded neck 26 of the drink bottle 28 when the connection portion 20 is in an inverted position such that the main portion 12 envelops an upper portion 40 of the drink bottle 28 when the connection portion 20 is engaged to the threaded neck 26 of the drink bottle 28.

The length of the connection portion 20 is such that the cap member 34 abuts a top surface 42 of the threaded neck 26 of the drink bottle 28 when the connection portion 20 is fully engaged to the threaded neck 26 and the cap member 34 is fully engaged to the connection portion 20.

In use, the connection portion 20 is screwed onto the threaded neck 26 of the drink bottle 28 in an inverted position for storage. The cap member 34 is engaged to the connection portion 20 using exterior surface threads 32 to prevent spillage while the drink bottle funnel 10 is stored on the drink bottle 28. The cap member 34 is removed, the connection portion 20 is disengaged from the threaded neck 26 and re-engaged to the threaded neck 26 such that the main portion 12 extends out from the drink bottle 28. Flavoring, typically in the form of a powder, may then be poured into the drink bottle 28 through the main portion 12 with reduced likelihood of spilling the flavoring.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A drink bottle funnel assembly for attachment to a threaded neck of a drink bottle, the drink bottle funnel comprising:

a main portion formed by a circumferential wall having a top opening and a bottom opening;

a tubular connection portion extending from said main portion around said bottom opening;

an interior surface of said connection portion having interior surface threads whereby said connection portion is adapted for threadably engaging the threaded neck of the drink bottle;

said interior surface threads extending along a full length of said connection portion such that said connection portion is adapted for engaging the threaded neck of the drink bottle when said connection portion is in an inverted position such that said main portion envelops an upper portion of the drink bottle when the connection portion is engaged to the threaded neck of the drink bottle;

an exterior surface of said connection portion having exterior surface threads;

a cap member having cap threads for said exterior surface threads; and a length of said connection portion is such that said cap member is adapted to abut a top surface of the threaded neck of the drink bottle when said connection portion is fully engaged to the threaded neck and said cap member is fully engaged to said connection portion.

2. The drink bottle funnel of claim 1, wherein said circumferential wall is curved extending from said bottom opening to said top opening.

3. The drink bottle funnel of claim 1, wherein said top opening and said bottom opening are circular.

4. The drink bottle funnel of claim 3, wherein said bottom opening is smaller in diameter than said top opening.

5. The drink bottle funnel of claim 3, wherein said top opening has a diameter of 2.5 inches.

6. The drink bottle funnel of claim 1, wherein said connection portion and said main portion have a combined height of 2 inches.

7. A drink bottle funnel assembly for attachment to a threaded neck of a drink bottle, the drink bottle funnel comprising:

a main portion formed by a circumferential wall having a top opening and a bottom opening;

a tubular connection portion extending from said main portion around said bottom opening;

an interior surface of said connection portion having interior surface threads whereby said connection portion is adapted for threadably engaging the threaded neck of the drink bottle;

an exterior surface of said connection portion having exterior surface threads;

a cap member having cap threads for engaging said exterior surface threads;

wherein said circumferential wall is curved extending from said bottom opening to said top opening;

wherein said top opening and said bottom opening are circular;

wherein said bottom opening is smaller in diameter than said top opening;

wherein said interior surface threads extend along a full length of said connection portion such that said connection portion is adapted for engaging the threaded neck of the drink bottle when said connection portion is in an inverted position such that said main portion envelops an upper portion of the drink bottle when the connection portion is engaged to the threaded neck of the drink bottle; and wherein a length of said connection portion is such that said cap member is adapted to abut a top surface of the threaded neck of the drink bottle when said connection portion is fully engaged to the threaded neck and said cap member is fully engaged to said connection portion.

8. The drink bottle funnel of claim 7, wherein said top opening has a diameter of 2.5 inches.

9. The drink bottle funnel of claim 7, wherein said connection portion and said main portion have a combined height of 2 inches.

10. A container system including:

a drink bottle having a threaded neck;

a main portion formed by a circumferential wall having a top opening and a bottom opening;

a tubular connection portion extending from said main portion around said bottom opening;

an interior surface of said connection portion having interior surface threads whereby said connection portion is adapted for threadably engaging said threaded neck of said drink bottle;

said interior surface threads extending along a full length of said connection portion such that said connection portion engages said threaded neck of said drink bottle when said connection portion is in an inverted position such that said main portion envelops an upper portion of said drink bottle when said connection portion is engaged to said threaded neck;

an exterior surface of said connection portion having exterior surface threads;

a cap member having cap threads for engaging said exterior surface threads; and a length of said connection portion is such that said cap member is abuts a top surface of said threaded neck of the drink bottle when said connection portion is fully engaged to said threaded neck and said cap member is fully engaged to said connection portion.

11. The system of claim 10, wherein said circumferential wall is curved extending from said bottom opening to said top opening.

12. The system of claim 10, wherein said top opening and said bottom opening are circular.

13. The system of claim 12, wherein said bottom opening is smaller in diameter than said top opening.

* * * * *